Patented July 30, 1946

2,404,893

UNITED STATES PATENT OFFICE 2,404,893

PREPARATION OF DIAZOTIZED 2,4-DINITRO-6-HALOGEN ANILINE

David L. Tchorni, Plainfield, and Glenn S. Watson, Martinsville, N. J., assignors to American Cyanamid Company, New York, N. Y., a corporation of Maine No Drawing. Application June 12, 1942, Serial No. 446,774

6 Claims. (Cl. 260—141)

This invention relates to an improved process of producing diazotized 2,4-dinitro-6-chlor- and bromaniline, and to the production of the halogen nitranilines themselves.

The diazo compounds obtained from 2,4-dinitro-6-chloraniline and 2,4-dinitro-6-bromaniline are important in the preparation of azo pigments which can be used in the dyeing of artificial fibers such as those made from cellulose acetate, vinyl halide-vinyl acetate copolymers and the like.

In the past it has been customary to prepare such diazo compounds by chlorinating and brominating 2,4-dinitroaniline, isolating the compound and then diazotizing in acid solution. This process has involved a number of steps and is particularly disadvantageous in that the equipment required for these steps had to be of special acid-resistant construction because of the extremely high corrosive action of hydrochloric acid or hydrobromic acid set free in the halogenation step. These factors have resulted in a relatively high cost of the diazo component and a considerable maintenance problem for the manufacturer.

The present invention is directed to an improved process which eliminates one of the steps and which does not require the use of special acid-proof material, it being possible to carry out the process in ordinary equipment.

According to the present invention 2-chlor-4-nitraniline or 2-brom-4-nitraniline is nitrated with ordinary mixed acid and the nitration solution, without isolation of the dinitrohalogen aniline, directly diazotized by the ordinary means. A solution of the diazo compound in the mixed acid is obtained and this solution may be diluted and without further purification used in coupling with the customary coupling components. The present invention therefore accomplishes in two steps what required three steps in the prior art and accomplishes the results without the use of special corrosion resistant material employing ordinary iron equipment. These marked advantages are obtained without losses in yield and a considerable saving in the cost of the diazo component is obtained.

It should be noted that not only does the present invention present an improved and more economical method of preparing diazotized 2,4-dinitrohalogen anilines, but the nitration step itself is a new process and presents marked advantages even where it is desired to isolate the nitrated material without diazotization. The same advantages in avoiding special costly acidproof equipment are enjoyed and the process represents a marked saving in cost.

The invention will be described in detail in conjunction with the following specific examples which are illustrative only. The parts are by weight.

Example 1

1380 parts of 98% sulfuric acid are charged into an iron reaction vessel equipped with a stirrer and a thermometer; furthermore provisions are made that the vessel may be cooled and heated. The vessel is cooled externally until the inside temperature is 10–15° C. Then while the sulfuric acid is stirred 172.5 parts dry 2-chloro-4-nitraniline are added, care being taken that the temperature remains within the abovementioned limits. When the base is completely dissolved the charge is externally cooled to 7° C. and then at this temperature there is uniformly added over a period of one hour a mixed acid containing 66.1 parts nitric acid, 95.7 parts sulfuric acid and 3.3 parts sulfur trioxide. Since an exothermic reaction takes place care has to be taken that the charge is properly cooled to maintain the temperature stated above. After all mixed acid has been added the charge is stirred for two hours and more at the same temperature.

70 parts solid sodium nitrite are then added in portions over a period of one hour; during this addition the temperature is allowed to rise to 15° C. where it has to be held by external cooling. After all nitrite has been added the charge is heated up to 40–50° C. over a period of half an hour. It is then stirred at the same temperature for two hours more and eventually externally cooled to 20–25° C.

The resulting solution contains an excellent yield of diazonium sulfate deriving from 2,4-dinitro-6-chloro-aniline and may be used for coupling reactions after it has been diluted with ice and water.

If it is desired to isolate the 2,4-dinitro-6-chloraniline instead of diazotizing it, the nitrating mixture is drowned by pouring into water and the dinitrochloraniline recovered by filtration. The product is of excellent quality.

Example 2

The procedure of Example 1 is carried out using a stoichiometrical equivalent amount of 2-brom-4-nitraniline instead of the 2-chlor-4-nitraniline. Excellent yields of the corresponding diazotized 2,4-dinitro-6-bromaniline are obtained which can be diluted with ice and water and used in coupling with any suitable coupling component.

If it is desired to isolate the 2,4-dinitro-6-bromaniline without diazotization, the nitrating mixture may be drowned in water as described in conjunction with the isolation of the corresponding chloro product in Example 1.

It is an advantage of the present invention that the diazo solution obtained may be used on dilution for coupling with conventional coupling components without the use of any new technique and the invention is not intended to be limited to the production of any particular azo dye. The diazo components of the present invention are, however, particularly useful in producing azo dyes such as those described in the patent to F. H. Adams, No. 2,266,142, dated December 16, 1941.

We claim:

1. A method of preparing a diazotized dispersion of 2,4-dinitro-6-halogen aniline which comprises nitrating a compound included in the group consisting of 2-chlor-4-nitraniline and 2-brom-4-nitraniline with mixed nitrating acids and diazotizing without preceding dilution with water and without isolation of the nitrated compounds to produce a dispersion of the diazotized 2,4-dinitro-6-halogen aniline.

2. A method of preparing a diazotized dispersion of 2,4-dinitro-6-halogen aniline which comprises nitrating 2-chlor-4-nitraniline with mixed nitrating acids and diazotizing without preceding dilution with water and without isolation of the nitrated compounds to produce a dispersion of the diazotized 2,4-dinitro-6-halogen aniline.

3. A method of preparing a diazotized dispersion of 2,4-dinitro-6-halogen aniline which comprises nitrating 2-brom-4-nitraniline with mixed nitrating acids and diazotizing without preceding dilution with water and without isolation of the nitrated compounds to produce a dispersion of the diazotized 2,4-dinitro-6-halogen aniline.

4. A method according to claim 1 in which the diazotization is effected by adding an alkali metal nitrite with cooling to prevent the reaction temperature from rising above room temperature, followed by heating up to 40–50° C. after the addition of the nitrite.

5. A method according to claim 2 in which the diazotization is effected by adding an alkali metal nitrite with cooling to prevent the reaction temperature from rising above room temperature, followed by heating up to 40–50° C. after the addition of the nitrite.

6. A method according to claim 3 in which the diazotization is effected by adding an alkali metal nitrite with cooling to prevent the reaction temperature from rising above room temperature, followed by heating up to 40–50° C. after the addition of the nitrite.

DAVID L. TCHORNI.
GLENN S. WATSON.